Patented Apr. 10, 1951

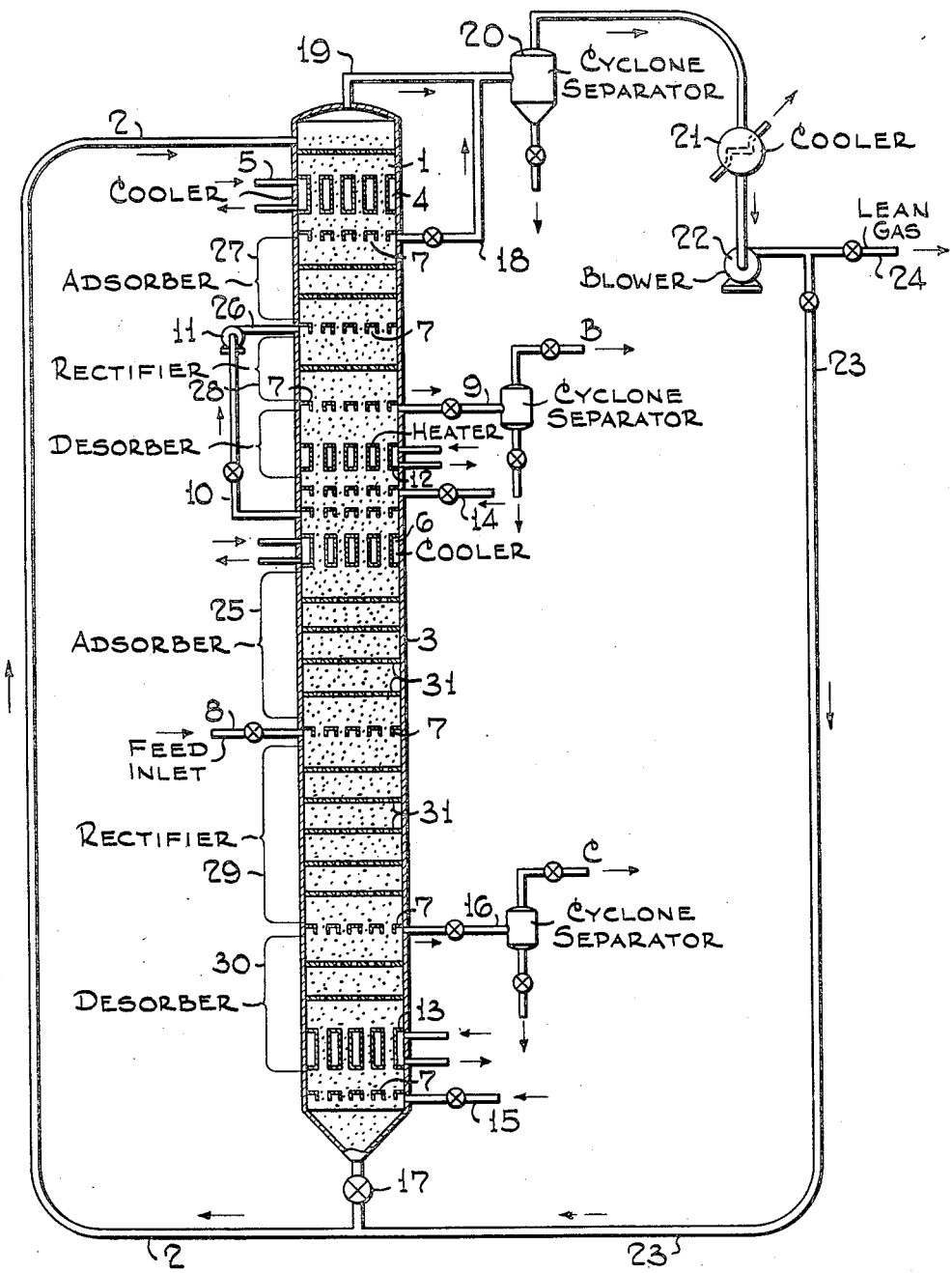

2,548,502

UNITED STATES PATENT OFFICE 2,548,502

FRACTIONATION WITH SOLID ADSORBENTS IN A SINGLE COLUMN

James K. Small, North Tarrytown, N. Y., assignor to Standard Oil Development Company, a corporation of Delaware Application December 28, 1946, Serial No. 718,919

13 Claims. (Cl. 183—114.2)

1

This invention relates to improvements in the art of fractionating mixtures by countercurrent contact of mixed vapors with moving masses of solid adsorbent particles. It applies especially to the fractionation of gaseous or vaporous mixtures of hydrocarbons.

The fractionation of a gaseous mixture by causing it to flow upwardly through an adsorption zone where it contacts an adsorbent material such as silica gel or carbon in small particle or powdered form which is passed downwardly through this zone has been already described. The adsorbent leaving the bottom of the adsorption zone is heated, with or without contact with a stripping gas such as steam, to desorb the adsorbed component of the gas, which is separately recovered. The stripped adsorbent is then cooled and returned to the top of the adsorption zone for re-use.

In such operation the adsorbent can be caused to exercise highly selective action in removing more readily adsorbed materials, such as hydrocarbons of higher boiling point, substantially completely from mixtures containing less readily adsorbed materials, such as similar hydrocarbon homologs of lower boiling point, if suitably extensive countercurrent contact of the gas mixture and solid adsorbent is provided to supply the necessary stages for the removal of the higher boiling hydrocarbon to the extent desired. However, it is difficult to obtain selective desorption of any particular component from the adsorbent. Each adsorbed component exercises its own vapor pressure and the gas composition in contact with the solid adsorbent thus tends to approach an equilibrium concentration for each adsorbed compound. Thus, under adsorption conditions, the solid adsorbent tends to adsorb appreciable quantities of each component present in the gas mixture, and under desorption conditions the adsorbent tends to release appreciable quantities of each compound which has been adsorbed. The lower boiling compounds of any particular chemical series are generally released more readily than the higher boiling compounds but under ordinary conditions, if both types of compounds have been adsorbed, the separation of the more volatile components in a state of high purity becomes very difficult. An even more difficult problem attends the concentration of an intermediate fraction from a mixture containing both more volatile and less volatile homologs.

The methods for accomplishing the preparation of intermediate fractions are dependent

2 upon the nature of the desired fraction and the point at which it is withdrawn from the primary adsorption-rectification zone. These are described broadly in copending applications entitled "Fractionation With Solid Adsorbents," Serial Numbers 721,113, now Patent No. 2,529,289, patented November 7, 1950, and 721,114, now Patent 2,495,842 granted January 31, 1950, assigned to the present assignee, directed particularly to the preparation of pure intermediate fractions which are withdrawn from the primary column at a point below the feed level.

An object of the present invention is to provide an improved process and apparatus for accomplishing such separation of intermediate fractions in a state of high purity by means of a solid adsorbent from mixtures also containing compounds which are less readily adsorbed than the desired intermediate components and also containing compounds which are more readily adsorbed than the desired intermediate components.

A further object of this invention is to accomplish this with a minimum of handling of the adsorbent in order to reduce the complexity of the equipment and the breakage and dusting of the adsorbent particles.

These and other objects of this invention will be apparent from the following description of one method of its application in a process for fractionation of a mixture of hydrocarbon gases by means of granular activated carbon.

A suitable apparatus for use in this process is shown diagrammatically in sectional elevation in the attached drawing.

Referring to the drawing, a hopper 1 is supplied with a suitable granular adsorbent; for example, with granular activated carbon such as steam-activated cocoanut charcoal of a particle size of about .1 to .01 inch diameter, by an adsorbent recycle line 2 which will be discussed below. This hopper supplies a tall cylindrical vessel 3 which is completely filled with the adsorbent. This vessel contains in its upper portion a bundle of vertical parallel cooling tubes 4 open at both ends. A cooling fluid such as water is circulated around the cooling tubes 4 from line 5. The cooling unit 6 is similar. The vessel 3 also contains several gas distributing plates or baffles 7. It is provided with a feed line 8, an intermediate product withdrawal line 9, an unadsorbed fraction by-pass line 10 which may contain a pump or blower 11, heating means such as heat transfer tubes 12 and 13, stripping gas supply lines 14 and 15, a heavy product withdrawal line 16 and a carbon withdrawal valve 17. Unadsorbed gas is withdrawn through line 18 and/or line 19. Entrained carbon is removed by suitable separating means such as cyclone separator 20. This gas may be cooled in cooler 21 and a portion recycled by means of blower 22 and line 23 for the purpose of returning carbon from valve 17 to hopper 1, the remaining unadsorbed gas being withdrawn by line 24. The other product withdrawal lines 9 and 16 may also be provided with suitable dust separators and with coolers, condensers, liquid separators and the like which are omitted from the drawings for purpose of simplicity.

In the operation of this apparatus a feed stream containing at least three components, A, B and C, differing in degree of adsorption on carbon, is passed into the tower through line 8 while granular carbon is passed slowly and continuously down the tower. The components A, B and C may comprise, for example, methane, $C_2$ hydrocarbons such as ethane and/or ethylene, and $C_3$ hydrocarbons such as propane and/or propylene.

The feed gases rising through the adsorption section 25 are deprived of the heavy component C by adsorption on the descending carbon, the amount of carbon and the length of this zone being determined by the extent to which component C is to be excluded from the intermediate fraction B. The remaining unadsorbed gases containing components A and B and substantially free of component C are withdrawn from the column through line 10 and reintroduced at a point higher up the column through line 26. The intermediate component B is then adsorbed on the descending carbon in the upper adsorption zone 27 and, with some adsorbed component A, is passed downwardly with the carbon into the rectification zone 28. The descending carbon is heated by heater 12 to liberate the adsorbed component B, a portion of which is passed upwardly into the rectification zone 28 to displace component A from the descending carbon. The remainder of the desorbed component B is withdrawn in a state of high purity in line 9. The heated carbon leaving heater 12 is cooled in cooler 6 before passing into the adsorption zone 25 for adsorption of component C as described above. In order to prevent contamination of component B by the by-passed gases, suitable means should be provided for effectively preventing these gases from rising through the heater 12. This may be accomplished by suitably balancing pressures so that some of component B passes downwardly through the heater 12, by means of mechanical gas blocks such as suitable valves controlling the downward flow of carbon below heater 12 or, more conveniently, by introduction of a blanketing gas such as steam, by line 14 with control of pressures in the column so that this steam flows upwardly through the heater 12 and a small portion of the steam also flows downwardly and into the by-pass line 10.

The descending carbon below the feed line 8 carries with it adsorbed components A and B as well as C, and these may be displaced to any extent desired in rectification zone 29 by means of a portion of component C, which is passed upwardly into this zone from the desorption zone 30. The remainder of the desorbed component C, with or without portions of lighter components A and B, is withdrawn through heavy product line 16. Component C is desorbed from the carbon by any suitable means, such as by heating in heater 13 and subjection to the action of a stripping gas such as steam which may be supplied by line 15. In operation such stripping steam is preferably withdrawn with the desorbed component C in line 16 and thereafter condensed and separated from the heavy product. Blanketing steam 14 is similarly withdrawn with component B in line 9 and thereafter condensed and separated from this intermediate product. Valve 17 is used to control the rate of passage of carbon through the column and may be of any suitable construction, such as a rotating star valve or a reciprocating feeder valve with off-set supply and discharge tubes. The carbon withdrawn through valve 17 is returned through the hopper 1 by any suitable methods, such as by suspension in a stream of inert or recycled unadsorbed gas 23 supplied at a sufficient velocity to provide a dilute suspension of carbon in the resulting gas mixture, this suspension being passed through line 2 into the upper portion of hopper 1 which is suitably constructed in the form of a separator so that the entrained carbon separates in this hopper and the gas passes out at the top through line 19. Entrained dust or fines are thus separated from this gas in separator 20. At least a portion of the unadsorbed gas leaving the top of adsorber 27 is preferably passed up through the cooler 4 in order to displace any water vapor from the descending carbon before it is cooled.

The general flow of adsorbent and gases through the equipment has been described above. The fractionation of feed mixtures in combination with such operation will now be described. These examples are given solely for purpose of illustration and the invention is not to be limited to the particular operating conditions stated, as these vary with the nature of the feed and the adsorbent.

Referring to the figure, a feed gas mixture containing methane, the $C_2$ hydrocarbons, ethane and ethylene, and the $C_3$ hydrocarbons, propane and propylene, is supplied by line 8 to the bottom of the adsorption zone 25, at which point the carbon may have a temperature of about 175° F. with the tower operated at a moderate pressure of about 1 to 6 atmospheres. This gas passes up through adsorber section 25 and substantially all of the $C_3$ hydrocarbons are adsorbed therein. The unadsorbed gases, methane and $C_2$ hydrocarbons, pass through lines 10 and 26 into the lower portion of adsorption zone 27 and upwardly through this zone, wherein the descending carbon adsorbs the $C_2$ hydrocarbons and a portion of the methane. Unadsorbed gases consisting largely of methane are removed from the upper portion of adsorption zone 27. The temperature of the granular activated adsorbent carbon entering the adsorber from the cooling tubes 4 is about 100 to 120° F.

The descending carbon is heated in heater 12 to about 400° F. in order to displace the adsorbed $C_2$ hydrocarbons, a portion of which is withdrawn in line 9 and the remainder is passed upwardly through the rectification zone 28 to displace methane from the descending carbon.

The carbon is cooled in cooler 6 to a temperature of about 100–120° F. It is heated by heater 13 in the lower portion of the desorption zone 30 to a temperature of about 500–550° F. in order to displace the adsorbed $C_3$ and heavier hydrocarbons. A portion of this desorbed gas is removed in line 16, the remainder being passed upwardly through rectification zone 29 to displace $C_2$ and lighter hydrocarbons from the descending carbon.

Any hydrogen also present in the feed gas will be removed along with the methane in lines 18 and 19 in the above-described operation, while $C_4$ and heavier hydrocarbons will be removed along with the $C_3$ hydrocarbons in line 16. One or more additional side streams for removal of intermediate fractions between the $C_2$ fraction and the heaviest fractions to be desorbed may also be provided at any suitable point in the rectification zone 29. If such additional lines are provided, the heaviest fraction desorbed will comprise the lowest product stream withdrawn and the upper streams below the feed will comprise mixtures of the more volatile components, the composition of such streams depending upon the extent of rectification in zone 29.

This invention may also be used in the separation of other mixtures of three or more components. For example, the process of this invention may be applied to the separation of an intermediate $C_3$ fraction of high purity in line 9 from a mixture containing $C_2$ and $C_4$ hydrocarbons, in which case the $C_2$ and any lighter hydrocarbons may be removed from the upper portion of the upper adsorption zone 27 and the $C_4$ and any heavier hydrocarbons may be removed in line 16 from the lower desorption zone 30. Such a fraction, for example, may contain methane, ethane, ethylene, propane, propylene, butanes, butylenes, pentanes and pentenes.

An example of suitable operating conditions for conducting the process as described above is as follows:

The tower 3 is 10 feet in diameter and about 140 feet high between the heating and cooling sections, each of which consists of a vertical tube bundle 20 feet long of adequate area for the heat transfer required. The adsorption and rectification zones are each about 20 or more feet in length, depending on the extent of close fractionation desired.

Carbon is supplied to the hopper 1 at a rate of 177 tons per hour. 673,000 cubic feet per hour (60° F. and one atmosphere) of a feed gas described below are supplied through line 8 at 60 p. s. i. g., the column being operated to take only the necessary pressure drop without disturbance of the steady downward flow of carbon. Thus, the tower 3 is maintained at a top pressure of about 15 p. s. i. g. and a bottom pressure of about 75 p. s. i. g. with lines 9 and 16 controlled at suitable intermediate pressures. The coolers and heaters are operated to maintain the carbon leaving coolers 4 and 6 at about 120° F. while it is heated to a temperature of about 400° F. in heater 12 and about 550° F. in heater 13. Analyses of an illustrative feed gas mixture and of the product fractions which may be produced when operating under these conditions are as follows:

| Component | Feed Gas (Line 8) | Unadsorbed Gas (Lines 18 and 19) | $C_2$ Cut (Line 9) | $C_3$+Cut (Line 16) |
|---|---|---|---|---|
| $H_2$ | 10.5 | 24.4 | | |
| $CH_4$ | 30.4 | 69.9 | 1.0 | |
| $C_2H_6$ | 9.4 | 2.2 | 27.3 | |
| $C_2H_4$ | 23.4 | 3.5 | 70.5 | 0.9 |
| $C_3H_8$ | 7.0 | | 1.1 | 25.4 |
| $C_3H_6$ | 16.0 | | 0.1 | 61.0 |
| $C_4$ | 1.8 | | | 6.9 |
| $C_5$ | 0.2 | | | 0.8 |
| $C_{6+}$ | 1.3 | | | 5.0 |
| Production ft.³/hr. (×1000) | 673 | 290 | 208 | 175 |

As indicated above, these conditions are designed to produce intermediate cuts containing very small amounts of higher boiling olefins. This is especially desirable in concentrating unsaturated hydrocarbon fractions for the production of pure synthetic alcohols as by hydration with sulfuric acid. For example, all propylene is excluded as rigidly as possible from the $C_2$ cut and butenes are similarly excluded from the $C_3$ cut, when the tower 3 is used to produce a purified $C_3$ cut. Even more rigid fractionation may be accomplished by suitably increasing the height of the rectification zones and by operating with higher internal "reflux ratios" in these zones.

The operation described above is designed particularly for use with granular particles of the adsorbent which completely fill the vessels described and which, except for the slow, downward motion attending passage through these vessels, undergo no other type of motion. The rising streams of feed and stripping gases or vapors under such cases are held at rates below those causing partial lifting or vibration of the solid particles. Such rates are suitably controlled by maintaining a pressure drop across the bed of solid adsorbent which is less than, and is preferably not more than .5 to .7 times the weight of the bed expressed in the same units. Higher gas velocities attending pressure drops equal to or slightly greater than the weight of the bed, cause partial lifting and vibration or even intense turbulent motion of the solid particles which resembles that of a boiling liquid. The process can also be conducted with the particles in such vibratory or "fluidized" motion, if suitable baffles or plates are provided to localize the motion of any particular particle. Using finely divided adsorbent in the form of a powder of about 100–300 mesh, for example, vessel 3 can be constructed in the form of an ordinary bubble tower or may be filled with masses of relatively large immobile packing, the plates or packing serving to limit the swirling action of the solids to a very small portion of the total height of the column and thus to provide for the necessary overall countercurrent motion of gases and solids which is required for separation of the feed stream into fractions of high purity. Even where such vibratory or fluidized motion is not used throughout the entire columns, it is advantageous in the heating and cooling tubes in order to increase their efficiency, as a slowly moving, non-vibrating solid bed is extremely difficult to heat or cool by indirect means because of its low heat conductivity. The gas velocities causing such vibratory or fluidized motion will vary with the size and density of the solid particles. In general, upward gas velocities below about 1.5 feet per second do not cause such motion with solid adsorbents having a particle size greater than 500 microns and having a bulk density between about 25 and 50 pounds per cubic foot. Upward gas velocities above about two feet per second are sufficient to cause partial lifting of such solid particles, resulting in vibration, the preferred gas velocities for such motion without intensive turbulence being between 2 and 5 feet per second. At higher velocities up to about 15 feet per second the solid particles assume a state of intense turbulence, resembling that of a boiled fluid, but are not completely entrained in the rising gas stream; that is, downward motion of the particles countercurrent to the rising gas stream is still possible. At still higher gas velocities the particles are entrained in the rising gas stream and lifted to such an extent that no substantial downward flow of the particles occurs and countercurrent flow of the solid and gas becomes impossible.

It will be understood that these operating conditions are presented for illustrative purposes and that suitable operating conditions will vary widely with the size and density of the solid material and with the operating temperatures and pressures used. In general, when operating with vibratory or fluidized solids, much larger gas and solid disengaging zones should be supplied than are suitable with non-vibrating solids and larger dust collectors should also be used, with provisions for return of the separated solids to the columns. This may be accomplished by injecting them with a gas stream such as the feed gas or the stripping gases or steam, or by the use of a screw conveyor such as an Archimedian screw.

The above-described processes may be conducted with solid adsorbent particles ranging from about 300 mesh up to about ¼ inch or larger and is preferably conducted with particles that will flow freely through a vertical tube without agitation. It is generally desirable to use particles of fairly uniform size in order to avoid solid segregation or elutriation effects.

The invention is generally applicable to fractionation processes of the type illustrated above, involving selective adsorption of one or more components from a mixture containing other components which are more and less readily adsorbed. In such operations it may be used to separate hydrocarbon mixtures into fractions of any desired boiling range or chemical structure by suitable selection of adsorbents and stripping agents in conformity with chromatographic principles. For example, paraffins, naphthenes, olefins, diolefins and aromatics may be obtained as separate fractions from mixtures of two or more of these classes of hydrocarbons with a silica gel adsorbent used in an adsorption process as described above in one or more stages according to the number of fractions to be separated. Similarly, organic vapors of different degrees of polarity may also be separated by selective adsorption on any suitable solid adsorbents.

While the process has been described above as conducted with a single solid adsorbent, it may also be conducted with mixtures of different types of solid adsorbents designed to supplement each other in accomplishing the separations desired. Thus, a mixture of activated carbon and silica gel may be used for the treatment of moist hydrocarbon gases, the silica gel serving to adsorb the water and to carry it down into the desorption zone while the charcoal serves to adsorb and fractionate the hydrocarbons. Similarly a mixture of activated carbon and solid cuprous chloride may be used in which advantage is taken of the increased adsorption capacity and selectivity of the cuprous chloride when dealing particularly with gases containing olefins and diolefins, and the activated charcoal is used to obtain greater recovery or "clean-up" of the desired hydrocarbons than is possible with the cuprous chloride alone, in view of the relatively high equilibrium partial pressures of the hydrocarbons under ordinary adsorption conditions over their cuprous chloride complexes.

I claim:

1. An improved process for concentrating an intermediate fraction B from a fluid feed mixture also containing a less readily adsorbed component A and a more readily adsorbed component C by means of a granular solid adsorbent, comprising passing said adsorbent downwardly through an adsorption-rectification zone comprising in consecutive order a first adsorption zone, a first rectification zone, an intermediate side stream separation zone, a first heating and desorption zone, a cooling zone, a second adsorption zone, a feed supply zone, a second product separation zone, a second desorption and heating zone, removing heated adsorbent from the bottom of said second heating zone, passing said fluid feed mixture into said feed supply zone and upwardly through said second adsorption zone wherein substantially all of component C is adsorbed, separating unadsorbed components of the feed from contact with the adsorbent at the top of said second adsorption zone and returning the said unadsorbed components to contact with the adsorbent near the bottom of said first adsorption zone, removing unadsorbed components comprising substantially all of component A from the upper portion of said first adsorption zone, removing a side stream comprising desorbed component B in a state of high purity from said intermediate separation zone while passing a portion of said desorbed component B upwardly through said first rectification zone to displace component A from the adsorbent descending therein, and removing a second product stream comprising desorbed component C from said second product separation zone.

2. An improved process for concentrating a $C_2$ hydrocarbon fraction from a gas mixture comprising $C_1$ to $C_3$ hydrocarbons by means of a granular solid adsorbent, comprising passing said adsorbent downwardly through an adsorption-rectification zone, comprising in consecutive order a first adsorption zone, a first rectification zone, an intermediate side stream separation zone, a first heating and desorption zone, a cooling zone, a second adsorption zone, a feed supply zone, a second rectification zone, a second product separation zone, a second desorption and heating zone, removing heated adsorbent from the bottom of said second heating zone, cooling the removed adsorbent and recycling it to the top of said adsorption-desorption zone, passing said gas mixture into said feed supply zone and upwardly through said second adsorption zone wherein substantially all the $C_3$ hydrocarbons are adsorbed, separating unadsorbed gases substantially free of $C_3$ hydrocarbons from contact with the adsorbent at the top of said second adsorption zone and returning the said unadsorbed gases to contact with the adsorbent near the bottom of said first adsorption zone, removing unadsorbed gases comprising substantially all of the said methane from the upper portion of said primary adsorption zone, removing a vapor side stream comprising desorbed $C_2$ hydrocarbons in a state of high purity from said intermediate separation zone while passing a portion of said desorbed $C_2$ hydrocarbons upwardly through said first rectification zone to displace methane from the adsorbent descending therein, removing a second product stream comprising desorbed $C_3$ hydrocarbons from said second product separation zone while passing a portion of said desorbed $C_3$ hydrocarbons upwardly through said second rectification zone to displace methane and $C_2$ hydrocarbons from the descending adsorbent therein.

3. Process according to claim 2, in which said feed gas mixture also contains hydrogen which is removed with the unadsorbed methane from the upper portion of said first adsorption zone.

4. Process according to claim 2, in which said feed gas mixture also contains $C_4$ hydrocarbons which are removed with the desorbed $C_3$ hydrocarbons in said second product separation zone.

5. Process according to claim 2, in which said feed gas mixture also contains higher boiling fractions comprising $C_4$ hydrocarbons which are adsorbed with the $C_3$ hydrocarbons in said second adsorption zone, which are desorbed in said second desorption zone and which are removed from said adsorption-rectification zone at a point not higher than that at which said desorbed $C_3$ hydrocarbons are removed.

6. Process according to claim 2, in which said feed gas mixture comprises methane, ethane, ethylene, propane and propylene.

7. Process according to claim 2, in which said feed gas mixture comprises hydrogen, methane, ethane, ethylene, propane, propylene, butanes and butylenes.

8. An improved process for concentrating a $C_3$ hydrocarbon fraction from a hydrocarbon mixture comprising $C_2$ to $C_4$ hydrocarbons by means of a granular solid adsorbent, comprising passing said adsorbent downwardly through an adsorption-rectification zone, comprising in consecutive order a first adsorption zone, a first rectification zone, an intermediate side stream separation zone, a first heating and desorption zone, a cooling zone, a second adsorption zone, a feed supply zone, a second rectification zone, a second product separation zone, a second desorption and heating zone, removing heated adsorbent from the bottom of said second heating zone, cooling the removed adsorbent and recycling it to the top of said adsorption-desorption zone, passing said hydrocarbon mixture into said feed supply zone and upwardly through said second adsorption zone, wherein $C_4$ hydrocarbons are substantially completely adsorbed, separating unadsorbed gases comprising $C_3$ and lighter hydrocarbons and substantially free of $C_4$ hydrocarbons from contact with the adsorbent at the top of said second adsorption zone and returning the said unadsorbed gases to contact with the adsorbent near the bottom of said first adsorption zone, removing unadsorbed gases comprising substantially all of the said $C_2$ hydrocarbons from the upper portion of said primary adsorption zone, removing a vapor side stream comprising desorbed $C_3$ hydrocarbons in a state of high purity from said intermediate separation zone while passing a portion of said desorbed $C_3$ hydrocarbons upwardly through said first rectification zone to displace $C_2$ hydrocarbons from the adsorbent descending therein, removing a second product stream comprising desorbed $C_4$ hydrocarbons from said second product separation zone while passing a portion of said desorbed $C_4$ hydrocarbons upwardly through said second rectification zone to displace $C_3$ and lighter hydrocarbons from the descending adsorbent therein.

9. Process according to claim 8, in which said hydrocarbon mixture also comprises methane which is removed with the $C_2$ hydrocarbons from the upper portion of said first adsorption zone.

10. Process according to claim 8, in which said hydrocarbon mixture also contains $C_5$ hydrocarbons which are desorbed in said second desorption zone and are removed from said adsorption-rectification zone at a point not higher than that at which said desorbed $C_4$ hydrocarbons are removed.

11. Process according to claim 8, in which said hydrocarbon mixture comprises ethane, ethylene, propane, propylene, butanes and butylenes.

12. Process according to claim 8, in which said hydrocarbon mixture comprises methane, ethane, ethylene, propane, propylene, butanes, butylenes, pentanes and pentenes.

13. A process for concentrating an intermediate fraction from a mixture of hydrocarbon vapors containing lighter and heavier fractions by fractionation of the mixture in a downwardly moving column of solid adsorbent, which comprises feeding the hydrocarbon mixture to the moving column of adsorbent, heating said adsorbent in a desorption zone at a point above the feed point to desorb said intermediate fraction, withdrawing the intermediate fraction as a sidestream, cooling the desorbed adsorbent and continuing its passage down the column, bypassing said desorption zone with the unadsorbed gases rising up the column from the feed point, and contacting the by-passed gases with a solid adsorbent in an adsorption zone above the desorption zone.

JAMES K. SMALL.

REFERENCES CITED

The following references are of record in the file of this patent:

UNITED STATES PATENTS

| Number | Name | Date |
|---|---|---|
| 1,577,534 | Miller | Mar. 23, 1926 |
| 1,825,707 | Wagner, Jr. | Oct. 6, 1931 |
| 1,836,301 | Bechthold | Dec. 15, 1931 |
| 1,868,565 | Connolly | July 26, 1932 |
| 2,376,425 | Frey | May 22, 1945 |
| 2,384,311 | Kearby | Sept. 4, 1945 |

OTHER REFERENCES

"Charcoal as an Adsorbent," Natural Gas, Nov. 1924, by J. B. Garner.

Clyde Berg, Transactions of A. I. Ch. E., vol. 42, No. 4, Aug. 1946, pages 665–680.